Jan. 17, 1950
J. FROST ET AL
2,494,803
MULTIPLE PASSAGE PIPE SECTIONS FOR
OIL WELL DRILLS OR THE LIKE
Filed Aug. 22, 1946
2 Sheets-Sheet 1
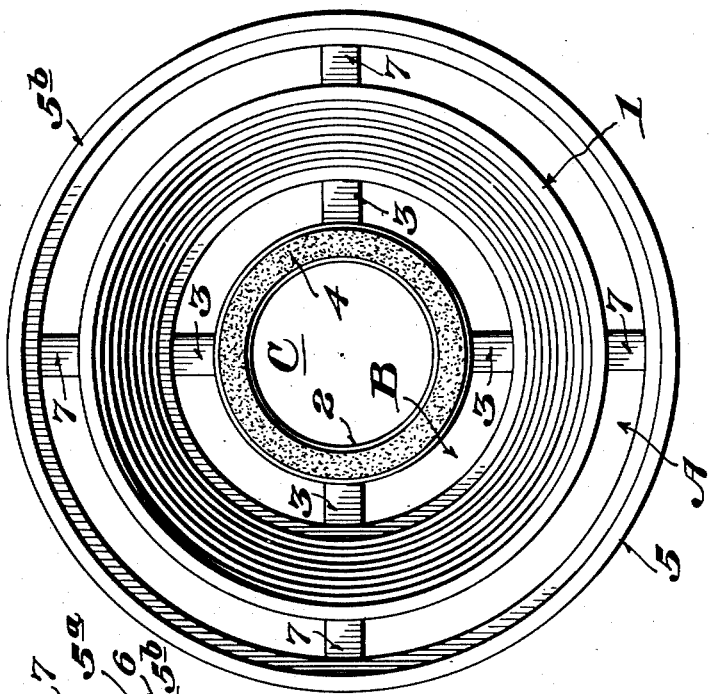
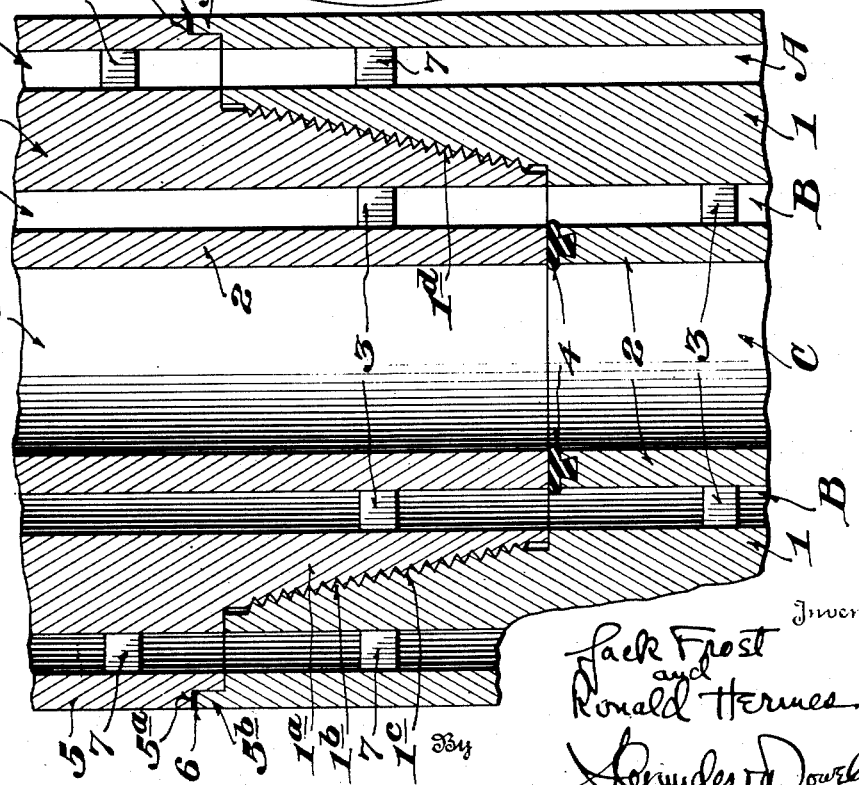
Inventors
Jack Frost
and
Ronald Hermes
By Alexander & Dowell
Attorneys

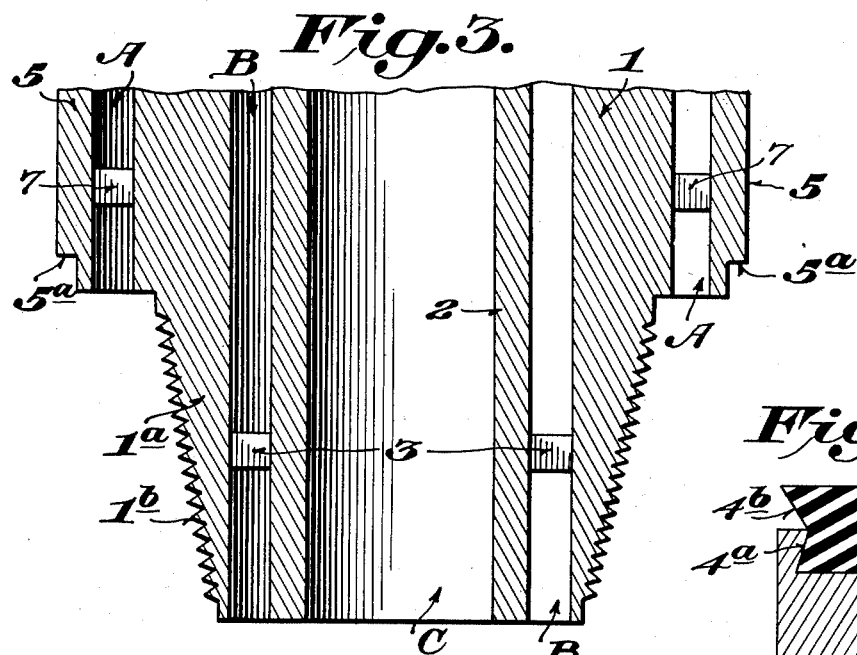
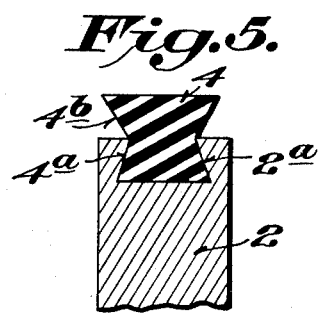
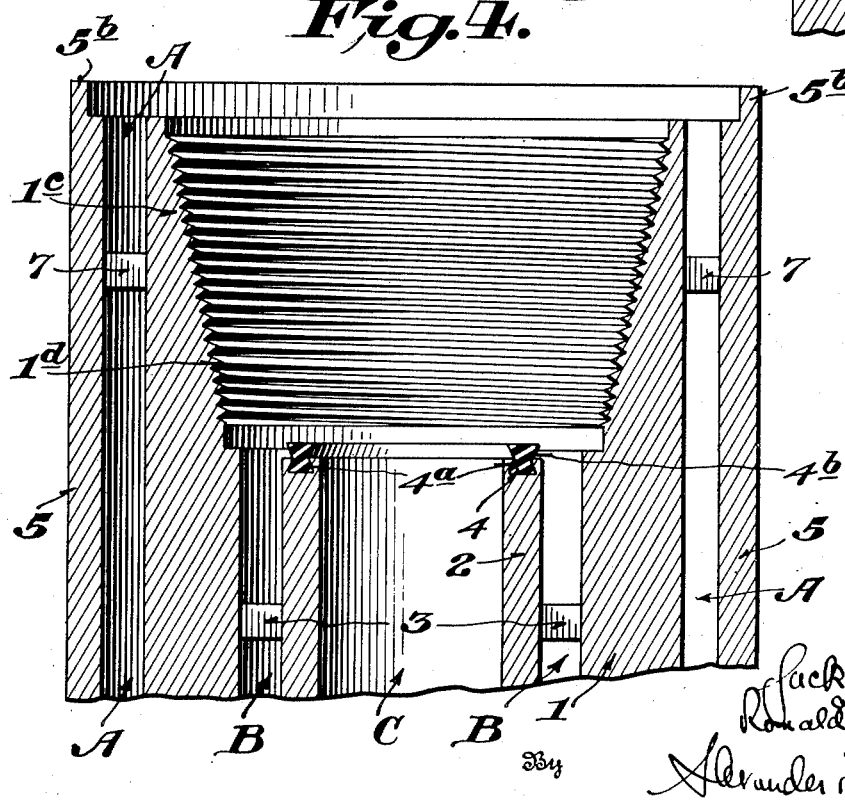

Patented Jan. 17, 1950

2,494,803

UNITED STATES PATENT OFFICE 2,494,803

MULTIPLE PASSAGE PIPE SECTIONS FOR OIL WELL DRILLS OR THE LIKE

Jack Frost, Dallas, and Ronald Hermes, Midland, Tex.

Application August 22, 1946, Serial No. 692,278

12 Claims. (Cl. 138—87)

1

Our invention is a novel improvement in multiple passage pipes, particularly those adapted for use in connection with oil well drills such as disclosed in my co-pending application Serial No. 656,851, filed March 25, 1946, in which sections of multiple passage pipes are connected together by means of tool joints through one of which passages drilling mud is passed down the drill to the tool bit, and through the other two passages air under pressure is passed to and from the pneumatic actuating means for the tool bit disposed adjacent the lower end of the drill. However, my novel multiple passage pipes may be utilized for any other purpose for which same is adapted.

The principal object of our present invention is to provide a simple, novel and efficient multiple passage pipe having novel tool joint means for connecting the sections of the pipe together, with means for maintaining the coaxial multiple passages separate from the others.

We will explain the invention with reference to the accompanying drawings which illustrate one practical embodiment thereof to enable others familiar with the art to adopt and use the same; and will summarize in the claims the novel features of construction, and novel combinations of parts, for which protection is desired.

In said drawings:

Figure 1 is a longitudinal section through adjacent pipe sections taken at the tool joint.

Fig. 2 is a top plan view of the female end of a pipe section at the tool joint.

Fig. 3 is a longitudinal section through the male end of a pipe section, detached.

Fig. 4 is a longitudinal section through the female end of a pipe section, detached.

Fig. 5 is an enlarged detail section showing the means for sealing the passages when the sections of the pipe are connected by the tool joints.

As shown, our multiple passage pipe section consists of a main cylindrical casing 1, of a substantial diameter and of wall thickness sufficient to withstand drilling torques, one end 1a of the pipe 1 being conically tapered and provided with threads 1b, end 1a comprising the male end of the tool joint. The opposite end of pipe 1 is provided with a conically enlarging bore 1c provided with threads 1d which are adapted to engage the threads 1b on the male end 1a of the adjacent pipe section, the threaded portion 1c comprising the female end of the tool joint.

Within the pipe 1 and concentric therewith is an inner pipe 2 spaced from the inner wall of the casing 1, pipe 2 being disposed coaxial with

2 pipe 1 and maintained in spaced relation within pipe 1 by means of spacers 3 adjacent the upper and lower ends of the pipe 2 as shown.

The inner pipe 2 extends from the outer end of the male end 1a of the tool joint to the inner end of the female end 1c of the tool joint, as shown, so that when the adjacent ends of the pipe sections are secured together as shown in Fig. 1, the adjacent ends of the inner pipe sections 2 will substantially abut, as shown in Fig. 1.

The spacers 3 as shown in Fig. 2 are preferably disposed 90° apart and are relatively narrow so as not to unnecessarily restrict the passage of air through the passage B between the pipes 1 and 2, but any other arrangement of spacers 3 may be utilized, the spacers being rigidly secured to the pipe sections 1 and 2 whereby same will impart to the assembly a substantially rigid unitary structure capable of withstanding enormous torques.

In order to seal communication between the passages B and C, we preferably provide annular seals 4 on the pipes 2 at the female ends of the tool joints, said seals 4 preferably comprising resilient rings of substantially the same diameter as the pipe 2, said rings having flaring inner ends 4a (Fig. 5) adapted to be retained in undercut annular recesses 2a in the upper ends of the pipe 2 as shown in Figures 4 and 5, the ring 4 flaring outwardly as at 4b above the tops of the pipes 2 and 3 so as to engage a substantial area of the contacting pipe 2 of the adjacent section when the sections are connected together, as shown in Figure 1. As the tool joints of the adjacent pipe sections are connected together, the projecting portions 4b of the sealing rings 4 will be spread due to pressure at the tool joint, and will assume the flattened shape shown in Fig. 1, thereby effectively sealing the adjacent ends of the pipes 2 so that the air passages B and C will be non-communicative.

Around the casing 1 is an outer pipe 5 spaced from the casing 1 and disposed concentrically therewith, the pipe 5 extending from the inner end of the male end 1a of the tool joint to the outer end of the female end 1c of the tool joint as shown in Figs. 1, 3 and 4 so that when adjacent sections are joined together as shown in Fig. 1 the ends of adjacent pipes 5 will substantially abut. Preferably one end of pipe 5 is provided with an annular recess 5a into which an annular extension 5b on the adjacent end of the adjacent pipe 5 enters, as shown in Fig. 1, a gasket 6 being preferably situated between the extension 5b and recess 5a to prevent escape of drilling mud from the outer passage A when the sections are united. Spacers 7 maintain the pipe 5 spaced from casing 1, the spacers being arranged similarly to spacers 3 and being rigidly secured to pipes 1 and 5 to impart to the assembly a rigid unitary structure to withstand enormous torques.

By the above construction, the annular passage A between the pipes 1 and 5, when the sections are connected together, may be utilized for passage of drilling mud to the tool bit, while the passage B between the pipes 1 and 2 and the passage C within the pipe 2 may be utilized for inlet and return of compressed air which operates the pneumatic devices controlling the bit per se.

We do not limit our invention to the exact form shown in the drawings, for obvious changes may be made therein within the scope of the claims.

We claim:

1. A multiple passage pipe section for oil well drills or the like, comprising a main casing having a male tool joint at one end and a complementary female tool joint at the other end; spaced pipes within and without the casing respectively and maintained in spaced relation with respect to walls of the casing providing separate passages therethrough; said inner pipe extending from the outer end of the male joint to the inner end of the female joint; said outer pipe extending from the inner end of the male joint to the outer end of the female joint; sealing means on one end of the inner pipe; and sealing means on the end of the outer pipe; said means sealing communication between the passages of adjacent sections when same are connected together by the tool joints.

2. In a pipe section as set forth in claim 1, spacer blocks maintaining said pipes in spaced relation to said casing, said blocks being disposed adjacent the ends of the pipes and being secured to the casing and the said related pipes to form a rigid unitary structure.

3. In a pipe section as set forth in claim 1, said sealing means on the inner pipe comprising an annular resilient ring having flaring side walls disposed in an annular undercut groove in the end of said pipe, said ring extending beyond the pipe and engaging a substantial area of the end of the pipe of the adjacent section.

4. A multiple passage pipe section for oil well drills or the like, comprising a main cylindrical casing having a threaded male tool joint at one end and a complementary threaded female tool joint at the other end; pipes coaxially arranged within the casing and maintained in spaced relation with respect to the inner wall of the casing; a second pipe coaxially arranged around the casing and maintained in spaced relation with respect to the outer wall of the casing; said pipes providing separate passages through the section; and means on the ends of the pipes for sealing communication between the passages of adjacent sections when same are connected together by the tool joints.

5. In a pipe section as set forth in claim 4, spacer blocks maintaining said pipes in spaced relation, said blocks being disposed adjacent the ends of the pipes and being secured to the inner wall of the casing and the said pipes to form a rigid unitary structure.

6. In a pipe section as set forth in claim 4, said sealing means for the inner pipe comprising an annular resilient ring having flaring side walls disposed in an annular undercut groove in the end of the pipe, said ring extending beyond the pipe and engaging a substantial area of the end of the pipe of the adjacent section.

7. A multiple passage pipe section for oil well drills or the like, comprising a main cylindrical casing having a male tool joint at one end and a complementary female tool joint at the other end; a pair of spaced pipes coaxially arranged within and without the casing and maintained in spaced relation with respect to each other and with the walls of the casing providing separate passages through the section; said inner pipe extending from the outer end of the male joint to the inner end of the female joint; said outer pipe extending from the inner end of the wall joint to the outer end of the female joint; and means on the ends of the pipes for engaging the ends of the pipes of an adjacent section to seal communication between the passages when adjacent sections are connected together by the tool joints.

8. In a pipe section as set forth in claim 7, spacer blocks maintaining said pipes in spaced relation, said blocks being disposed adjacent the ends of the pipes and being secured to the inner wall of the casing and the outer pipe, and between adjacent pipes to form a rigid unitary structure.

9. In a pipe section as set forth in claim 7, said sealing means for the inner pipe comprising an annular resilient ring having flaring side walls disposed in an annular undercut groove in the end of the pipe, said ring extending beyond the pipe and being enlarged to engage a substantial area of the end of the pipe of the adjacent section.

10. A multiple passage pipe section for oil well drills or the like, comprising a main cylindrical casing; a pair of spaced pipes within and without the casing respectively coaxially arranged and maintained in spaced relation with respect to each other and with the walls of the casing to provide separate passages through the section; and means on the ends of the pipes for engaging the ends of the pipes of an adjacent section to seal communication between the passages when adjacent sections are connected together.

11. In a pipe section as set forth in claim 10, spacer blocks maintaining said pipes in spaced relation, said blocks being disposed adjacent the ends of the pipes and being secured to the inner wall of the casing and the said pipes to form a rigid unitary structure.

12. In a pipe section as set forth in claim 10, said sealing means for the inner pipe comprising an annular resilient ring having flaring side walls disposed in an annular undercut groove in the end of the pipe, said ring extending beyond the pipe and being enlarged to engage a substantial area of the end of the pipe of the adjacent section.

JACK FROST.
RONALD HERMES.

REFERENCES CITED

The following references are of record in the file of this patent:

UNITED STATES PATENTS

| Number | Name | Date |
|---|---|---|
| 369,813 | Rader | Sept. 13, 1887 |
| 1,876,627 | Davis et al. | Sept. 13, 1932 |